United States Patent
Zhang et al.

(10) Patent No.: US 9,868,271 B2
(45) Date of Patent: Jan. 16, 2018

(54) COMPOSITE SHEET, ELECTRONIC APPARATUS AND METHOD FOR PRODUCING A COMPONENT FROM COMPOSITE SHEET

(71) Applicants: Beijing Lenovo Software Ltd., Beijing (CN); Lenovo (Beijing) Limited, Beijing (CN)

(72) Inventors: Chunsun Zhang, Beijing (CN); Zhigang Na, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 0 days.

(21) Appl. No.: 14/659,822

(22) Filed: Mar. 17, 2015

(65) Prior Publication Data
US 2016/0107349 A1    Apr. 21, 2016

(30) Foreign Application Priority Data

Oct. 21, 2014   (CN) .................. 2014 2 0611689 U
Dec. 24, 2014   (CN) .................. 2014 1 0818092

(51) Int. Cl.
*H05K 5/00*    (2006.01)
*B32B 27/08*   (2006.01)
(Continued)

(52) U.S. Cl.
CPC ........ *B32B 27/08* (2013.01); *B29C 45/14811* (2013.01); *B32B 1/00* (2013.01);
(Continued)

(58) Field of Classification Search
None
See application file for complete search history.

(56) References Cited

U.S. PATENT DOCUMENTS

| 8,535,484 B2* | 9/2013 | Hansen | D21F 1/0063 |
| | | | 162/358.2 |
| 2004/0263761 A1* | 12/2004 | Tannas, Jr. | G02F 1/1339 |
| | | | 349/153 |

(Continued)

FOREIGN PATENT DOCUMENTS

| CN | 103507205 A | 1/2014 |
| CN | 204414676 U | 6/2015 |

(Continued)

OTHER PUBLICATIONS

"Japanese Application Serial No. 2015-050437, Office Action dated Apr. 4, 2016", w/ English Translation, 8 pgs.
(Continued)

*Primary Examiner* — Courtney Smith
*Assistant Examiner* — Rashen E Morrison
(74) *Attorney, Agent, or Firm* — Schwegman Lundberg & Woessner, P.A.

(57) ABSTRACT

The embodiment of the present disclosure provides a composite sheet, an electronic apparatus and a method for producing a component from the composite sheet, the composite sheet comprises a first sheet layer, a second sheet layer and a solid layer, wherein, the first sheet layer comprises at least one layer of first reinforced material; the second sheet layer comprises at least one layer of second reinforced material; the solid layer is located between the first sheet and the second sheet layer, wherein the solid layer is capable of being protruded from an interlayer space between the first sheet and the second sheet layer. Because the solid layer may be thermoplastic resin material which has a light weight, the entire weight of the composite sheet may be reduced. And during the over-molding process, the solid layer can effectively prevent the injection molding plastics from permeating into the composite sheet and thus prevent the deformation problem of the sheet layers on the
(Continued)

surfaces of the composite sheet caused by the permeation, so that the composite sheet can maintain a better shape and the product quality is increased.

16 Claims, 4 Drawing Sheets

(51) Int. Cl.
| | |
|---|---|
| *B32B 5/12* | (2006.01) |
| *B29C 45/14* | (2006.01) |
| *B32B 5/06* | (2006.01) |
| *B32B 5/08* | (2006.01) |
| *B32B 5/22* | (2006.01) |
| *B32B 5/26* | (2006.01) |
| *B32B 27/12* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 1/00* | (2006.01) |
| *B29L 31/34* | (2006.01) |

(52) U.S. Cl.
CPC .................. *B32B 5/06* (2013.01); *B32B 5/08* (2013.01); *B32B 5/12* (2013.01); *B32B 5/22* (2013.01); *B32B 5/26* (2013.01); *B32B 27/12* (2013.01); *B32B 27/304* (2013.01); *B32B 27/32* (2013.01); *B32B 27/34* (2013.01); *B32B 27/365* (2013.01); *B29K 2713/00* (2013.01); *B29L 2031/3481* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2262/14* (2013.01); *B32B 2307/50* (2013.01); *B32B 2307/718* (2013.01); *B32B 2307/72* (2013.01); *B32B 2457/00* (2013.01)

(56) References Cited

U.S. PATENT DOCUMENTS

| | | | | |
|---|---|---|---|---|
| 2006/0070339 | A1* | 4/2006 | Peneder | E04C 3/14 52/837 |
| 2007/0202314 | A1* | 8/2007 | Youn | B32B 27/12 428/297.4 |
| 2010/0163549 | A1* | 7/2010 | Gagas | H05B 6/1209 219/622 |
| 2011/0090632 | A1* | 4/2011 | Raff | G06F 1/1616 361/679.27 |
| 2014/0302276 | A1* | 10/2014 | Kusu | B32B 27/12 428/113 |

FOREIGN PATENT DOCUMENTS

| | | |
|---|---|---|
| JP | 09272134 A | 10/1997 |
| JP | 2009173027 A | 8/2009 |
| JP | 2010147377 A | 7/2010 |

OTHER PUBLICATIONS

"Chinese Application No. 201410818092.4, Office Action dated Jun. 9, 2017", w/ English Translation, (Jun. 9, 2017), 21 pgs.

\* cited by examiner

COMPOSITE SHEET, ELECTRONIC APPARATUS AND METHOD FOR PRODUCING A COMPONENT FROM COMPOSITE SHEET

CROSS-REFERENCE TO RELATED APPLICATION

This application claims the benefit under 35 U.S.C. 119 to Chinese patent application No. 201420611689.7 filed on Oct. 21, 2014 and claims the benefit under 35 U.S.C. 119 to Chinese patent application No. 201410818092.4 filed on Dec. 24, 2014, the entire contents of which are incorporated herein by reference.

BACKGROUND

Technical Field

The present disclosure relates to the electronic technique filed, in particular, to a composite sheet, an electronic apparatus and a method for producing a component from composite sheet.

Related Art

Currently, in most electronic apparatus, composite material is used as a material forming the housing thereof, in order to decrease the thickness and weight of the electronic apparatus and to increase the protective strength on the electronic apparatus by the housing. In general, the used composite sheet is a composite material formed by stacking same reinforced fiber layers, however, the composite sheet in this structure is relatively heavy and the cost is relatively high, and it cannot bond with an injection molding material better during an over-molding process.

SUMMARY

The embodiment of the present disclosure provides a composite sheet, an electronic apparatus and a method for producing a component from the composite sheet, in order to solve at least one aspect of the problems existing in the prior art, which are the composite sheet is relatively heavy, the cost is relatively high, and it cannot bond with an injection molding material better during the over-molding process.

Specifically, the technical solutions are as follows.

Provided is a composite sheet comprising a first sheet layer, a second sheet layer and a solid layer, wherein, the first sheet layer comprises at least one layer of first reinforced material; the second sheet layer comprises at least one layer of second reinforced material; the solid layer is located between the first sheet and the second sheet layer, wherein the solid layer is capable of being protruded from an interlayer space between the first sheet and the second sheet layer.

Provided is an electronic apparatus comprising a body; a housing having a shape mating with the body, the housing being formed of the composite sheet, wherein the composite sheet comprises a first sheet layer, a second sheet layer and a solid layer, the first sheet layer comprises at least one layer of first reinforced material, the second sheet layer comprises at least one layer of second reinforced material, the solid layer is located between the first sheet and the second sheet layer; wherein the solid layer comprises a first portion and a second portion, the first portion is a portion of the solid layer being protruded from an interlayer space formed between the first sheet and the second sheet layer under pressure, and the second portion is located in the interlayer space to bond the first sheet layer with the second sheet layer.

Provided is a method for producing a component from a composite sheet, comprising steps of:

compressing a rough composite sheet from a first thickness to a second thickness in a preset mold under a preset temperature, so that a solid layer is heated to be softened to protrude from an interlayer space formed between a first sheet layer and a second sheet layer, wherein the first sheet layer comprises at least one layer of first reinforced material and the second sheet layer comprises at least one layer of second reinforced material;

filling an injection molding material into a cavity between the rough composite sheet and the preset mold to form the component, wherein the protruded portion of the solid layer is bonded with the injection molding material.

The technical effect of the above technical solutions of the present disclosure will be explained in detail with reference to the detailed embodiments of the specification.

DETAILED DESCRIPTION OF EMBODIMENTS

The First Embodiment

A composite sheet is provided in the embodiment of the present disclosure, which comprises a first sheet layer, a second sheet layer and a solid layer, wherein, the first sheet layer comprises at least one layer of first reinforced material; the second sheet layer comprises at least one layer of second reinforced material; the solid layer is located between the first sheet and the second sheet layer, wherein the solid layer is capable of being protruded from an interlayer space between the first sheet and the second sheet layer.

In the embodiment of the present disclosure, the composite sheet comprises the first sheet layer, the second sheet layer and the solid layer located between the first sheet and the second sheet layer, and the material of the solid layer may use thermoplastic resin, a first surface of the solid layer contacts with the first sheet layer and a second surface of the solid layer contacts with the second sheet layer, thus the composite sheet has a better rigidity by using the first sheet layer and the second sheet layer.

In addition, because the solid layer may be thermoplastic resin material which has a light weight, the entire weight of the composite sheet may be reduced. And during the overmolding process, the solid layer can effectively prevent the injection molding plastics from permeating into the composite sheet and thus prevent the deformation problem of the sheet layers on the surfaces of the composite sheet caused by the permeation, so that the composite sheet can maintain a better shape and the product quality is increased.

In addition, because the solid layer may be thermoplastic resin material, in the case that the rigidity of the housing is met, the number of layers of the reinforced material required by the first sheet layer and/or the second sheet layer is reduced, thus, the weight of the housing formed by the composite sheet is reduced and the cost thereof is also reduced.

For understanding the above-described technical solution better and making the objectives and advantages of the present disclosure more clear, the above-described technical solution will be explained in detail in combination with the accompanying drawings of the specification. Obviously, the described embodiments are only a part of embodiments of the technical solution of the present disclosure and not all embodiments. Based on embodiments described in the present specification, all other embodiments which can be obtained by those skilled in the art without any creative work belong to the scope of the present disclosure.

In the embodiments of the present disclosure, the electronic apparatus can be understood as notebook computer, PAD (tablet computer), cell phone and so on, the embodiments of the present disclosure are not limited to this.

In the embodiments of the present disclosure, the composite sheet can be used to manufacture the housing of the electronic apparatus, for example, the composite material is used to manufacture the housing of a cell phone or tablet computer or the like. In general, the housing of the electronic apparatus is mainly used to protect each component within the electronic apparatus, secondly, the light and thin property of the electronic apparatus depends on the light and thin property of the housing, thus, it is becoming more and more valuable to decrease the thickness and weight of the housing during manufacturing the electronic apparatus.

In order to ensure the strength and the light and thin property of the housing, the housing is generally made from the composite sheet which is also called as composite material, the composite material is a solid material consisting of two or more physical material, in other words, the composite material is a material which is formed by combining a matrix material with another reinforced material, and the materials can complement each other in property to produce a cooperative effect, so that the overall performance of the composite material is better than the original composition of the composite material to meet various requirements. The matrix material of the composite material includes two categories: metal and nonmetal, wherein the common metallic matrix material includes aluminium, magnesium, copper, titanium and their alloys, the nonmetallic matrix material mainly includes synthetic resin, rubber, ceramic, graphite, carbon, etc. And the common reinforced material mainly includes glass fiber, carbon fiber, boron fiber, aramid fiber, silicon carbide fiber, asbestos fiber, whisker, metal wire, tough granule, etc.

Figure 1:
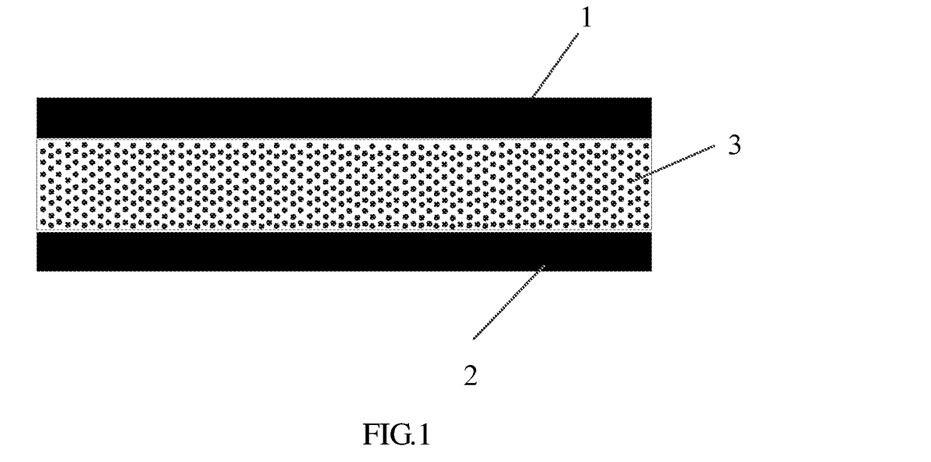
FIG. 1 is a schematic view showing a structure of a composite sheet according to an embodiment of the present disclosure.

In order to achieve the strength and the light and thin property of the housing, the embodiment of the present disclosure provides a composite sheet which can be used to produce the housing of the electronic apparatus, FIG. 1 is a schematic view showing the structure of the composite sheet according to the embodiment of the present disclosure. The composite sheet in the embodiment of the present disclosure comprises a first sheet layer 1, a second sheet layer 2 and a solid layer 3.

In the embodiment of the present disclosure, the first sheet layer 1 can form an external surface of the housing of the electronic apparatus, the first sheet layer 1 may comprise at least one layer of first reinforced material, the first reinforced material comprises at least one of glass fiber, carbon fiber, Kevlar fiber and fiber reinforced plastics (FRP), and the first reinforced material may also comprise any combination of these fibers, for example, the combination of carbon fiber and glass fiber, moreover, each layer of the reinforced material forming the first sheet layer 1 may be bonded together by heat pressing or gluing. Wherein, the FRP may be thermoset FRP, FRP is a kind of plastics which can be cured or has insoluble or unmelted property under the heat or other conditions, such as phenolic plastics, epoxy plastics, etc.

In general, G is prefixed when using glass fiber reinforcement, such as GFRP, GFRTP; C is prefixed when using carbon fiber reinforcement; K is prefixed when using aramid polyamide fiber reinforcement (Kevlar).

Specifically, the glass fiber is usually used in the reinforced plastics, and has many varieties. For example, alkali-free glass fiber (E-glass) is a common fiber, which has a low content of alkali metal oxide and has a more excellent chemical stability and electronic insulating property; and high strength glass fiber (S-glass) contains the compositions such as magnesium aluminosilicate and has a strength of 10%-50% higher than E-glass fiber, there are also other various glass fibers made by different chemical composition and production process, such as high-modulus glass fiber, medium-alkali glass fiber, high-alkali glass fiber and so on, which are not introduced here one by one. Carbon fiber has strong rigidity and excellent corrosion resistance, it is often used in reinforced thermoset plastics; boron fiber is a composite material of tungsten and boron, and has a relatively larger elasticity modulus, in general, the thickness of a single layer of reinforced material is about 0.2 mm.

The first sheet layer 1 is formed by stacking at least the first fiber layer and the second fiber layer, wherein, there is a first stacking angle between the first fiber layer and the second fiber layer, the first stacking angle is an angle between the fiber of the first fiber layer and the fiber of the second fiber layer.

Examples of the compositions of some first sheet layers 1 will be described next.

A First Example

The first reinforced material may be carbon fiber, the first sheet layer 1 may be formed by stacking the first carbon fiber layer and the second carbon fiber layer, the first carbon fiber layer and the second carbon fiber layer may be stacked at a first stacking angle which is an angle between the carbon fiber of the first carbon fiber layer and the carbon fiber of the second carbon fiber layer. In other words, after the first carbon fiber layer is arranged in place, the second carbon fiber layer is then arranged to intersect with the first carbon fiber layer. In general, the first stacking angle may be 60° or 90°, and alternatively, the first stacking angle can be selected as required to ensure the strength of the first sheet layer 1.

A Second Example

The first reinforced material may also be a first mixed fiber of carbon fiber and glass fiber, and the ratio of the carbon fiber and the glass fiber in the first mixed fiber can be adjusted as required, for example, this ratio may be 5:5 or 6:4 or the like.

In this example, the first sheet layer 1 may be formed by stacking the first mixed fiber layer and the second mixed fiber layer, the stacking angle between the first mixed fiber layer and the second mixed fiber layer may also be the first stacking angle in the first example, it is no longer described here.

In addition, it should be noted that the first sheet layer 1 may also be formed by stacking the first mixed fiber layer and the first carbon fiber layer, the stacking manner is no longer described here.

A Third Example

The first reinforced material may also be glass fiber, and the first sheet layer 1 is formed by stacking the first glass fiber layer and the second glass fiber layer at the first stacking angle.

It should be noted that the first sheet layer 1 may also be formed by the first glass fiber layer and the first carbon fiber layer, or by the first glass fiber layer and the first mixed fiber layer. The first sheet layer 1 formed by different fiber layers has some difference in strength and weight, for example, when the first sheet layer 1 is formed by two layers of carbon fiber, the strength of the composite sheet is relatively high, and the weight thereof is relatively light, while the cost thereof is increased correspondingly; when the first sheet layer 1 is formed by the first mixed fiber layer and the first carbon fiber layer, the strength of the composite sheet is also relatively high, but lower than the entire carbon fiber, and the weight thereof is also relatively light, but heavier than the entire carbon fiber; when the first sheet layer 1 is entirely formed by glass fibers, the strength of the composite sheet is relatively low, and the weight thereof is relatively heavy, while the cost thereof is lower. Thus, the first sheet layer 1 may be formed in various ways, the specific forming material is not limited in the embodiments of the present disclosure, in actual applications, the forming material of the first sheet layer 1 can be selected as required, for example, it can be determined depending on the requirement of the production cost.

Alternatively, the first sheet layer can be formed by a plurality of fiber layers, the number of the fiber layers contained in the first sheet layer is not limited in the embodiments of the present disclosure.

Similarly, in the embodiment of the present disclosure, the second sheet layer 2 is parallel to the first sheet layer 1, thus the first sheet layer 1 and the second sheet layer 2 may form the upper and lower surfaces of the housing respectively. The second sheet layer 2 comprises at least one layer of the second reinforced material, the second reinforced material comprises at least one of carbon fiber, glass fiber, Kevlar fiber, the second sheet layer 2 is formed by stacking at least the third fiber layer and the fourth fiber layer, wherein, there is a second stacking angle between the third fiber layer and the fourth fiber layer, the second stacking angle is an angle between the fiber of the third fiber layer and the fiber of the fourth fiber layer.

Examples of the compositions of some second sheet layers 2 will be described next.

A First Example

The second reinforced material may be carbon fiber, the second sheet layer 2 may be formed by stacking the third carbon fiber layer and the fourth carbon fiber layer, the third carbon fiber layer and the fourth carbon fiber layer may be stacked at a first stacking angle which is an angle between the carbon fiber of the third carbon fiber layer and the carbon fiber of the fourth carbon fiber layer. In other words, after the third carbon fiber layer is arranged in place, the fourth carbon fiber layer is then arranged to intersect with the third carbon fiber layer. In general, the first stacking angle may be 60° or 90°, and alternatively, the first stacking angle can be selected as required to ensure the strength of the second sheet layer 2.

A Second Example

The second reinforced material may also be a first mixed fiber of carbon fiber and glass fiber, and the ratio of the carbon fiber and the glass fiber in the first mixed fiber can be adjusted as required, for example, this ratio may be 5:5 or 6:4 or the like.

In this example, the second sheet layer 2 may be formed by the first mixed fiber layer and the second mixed fiber layer, the stacking angle between the first mixed fiber layer and the second mixed fiber layer may also be the first stacking angle in the first example, it is no longer described here.

In addition, it should be noted that the second sheet layer 2 may also be formed by stacking the first mixed fiber layer and the first carbon fiber layer, the stacking manner is no longer described here.

A Third Example

The second reinforced material may also be glass fiber, and the second sheet layer 2 is formed by stacking the third glass fiber layer and the fourth glass fiber layer at the first stacking angle.

It should be noted that the second sheet layer 2 may also be formed by the third glass fiber layer and the third carbon fiber layer, or by the third glass fiber layer and the first mixed fiber layer. The second sheet layer 2 formed by different fiber layers has some difference in strength and weight, for example, when the second sheet layer 2 is formed by two layers of carbon fiber, the strength of the composite sheet is relatively high, and the weight thereof is relatively light, while the cost thereof is increased correspondingly; when the second sheet layer 2 is formed by the first mixed fiber layer and the third carbon fiber layer, the strength of the composite sheet is also relatively high, but lower than the entire carbon fiber, and the weight thereof is also relatively light, but heavier than the entire carbon fiber; when the second sheet layer 2 is entirely formed by glass fibers, the strength of the composite sheet is relatively low, and the weight thereof is relatively heavy, while the cost thereof is lower. Thus, the second sheet layer 2 may be formed in various ways, the specific forming material of the second sheet layer 2 is not limited in the embodiment of the present disclosure, in actual applications, the forming material of the second sheet layer 2 can be selected as required.

It should be noted that the material forming the first sheet layer 1 does not affect the material forming the second sheet layer 2, for example, when the first sheet layer 1 is entirely formed by carbon fiber, the second sheet layer 2 may be formed by mixed fiber layer and carbon fiber layer. Thus, in actual applications, the first sheet layer 1 and the second sheet layer 2 can be adjusted as required.

In addition, it should be noted that the first sheet layer 1 and the second sheet layer 2 may also be formed by three layers of material, for example, by stacking three layers of carbon fiber, by stacking three layers of mixed fiber, by stacking three layers of glass fiber or the like. Alternatively, the first sheet layer 1 and the second sheet layer 2 may also be formed by one layer or four layers of material, the material and the number of layers forming the first sheet layer 1 and the second sheet layer 2 are not limited in the embodiment of the present disclosure. Alternatively, the composition of the second sheet layer 2 may be totally the same as that of the first sheet layer 1, or may be different from that of the first sheet layer 1, this can be adjusted as required.

Further, as shown in FIG. 1, a solid layer is arranged between the first sheet layer 1 and the second sheet layer 2, the solid layer may be thermoplastic resin material. The thermoplastic resin has characteristics of softening on heat and hardening on cooling and has a stable chemical properties, in particular, it still maintains the stable properties no matter how many times it is heated and cooled. During the forming process, the resin is first softened to flow by pressurizing and heating without producing any chemical crosslinking, then it is shaped in a mold, and forms, after being cooled, a required product with the special shape. In general, the thermoplastic resin forming the solid layer 3 may be polytene (PE), polyvinyl chloride (PVC), polyamide (PA), polycarbonate (PC), etc.

Specifically, in the embodiment of the present disclosure, the physical layer 3 has a first surface and a second surface, the first surface may contact with the first sheet layer 1 and the second surface may contact with the second sheet layer 2, that is, the first surface and the second surface may be two contacting surface through which the solid layer 3 contacts with the surface layers, and the first sheet layer 1, the second sheet layer 2 and the solid layer 3 are joined by heat pressing or bonding, so that the composite sheet has a good tightness to increase the rigidity of the formed product, meanwhile, since the weight of the thermoplastic resin material is low, the weight of the product is decreased.

Alternatively, in a general case, the area of the solid layer 3 is the same as that of the first sheet layer 1 and/or the second sheet layer 2. The first sheet layer 1 and the second sheet layer 2 have an identical area, and the area of the solid layer 3 arranged between the two layers is the same as this identical area.

Figure 2:
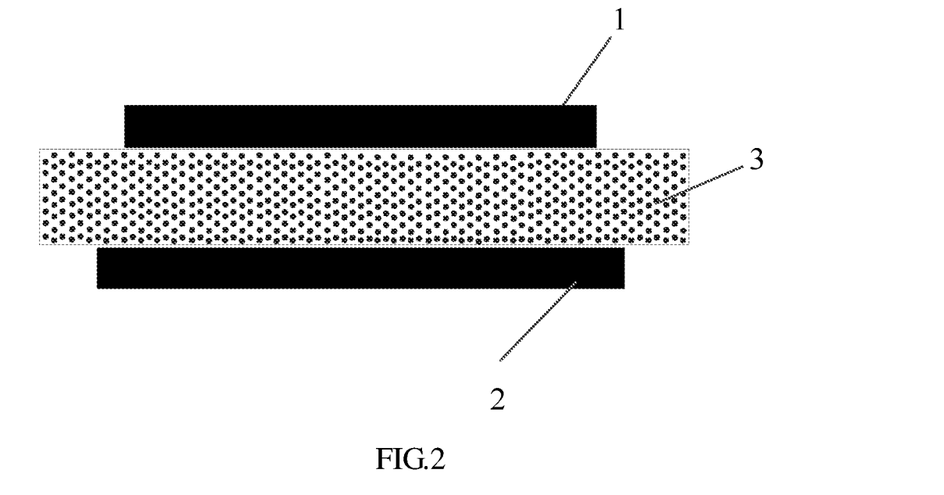
FIG. 2 is another schematic view showing a structure of a composite sheet according to an embodiment of the present disclosure.

However, in the producing process of the actual product, the first sheet layer 1 and the second sheet layer 2 may have different areas due to the requirements of design or production, in this case, the area of the solid layer 3 may be the same as that of the first sheet layer 1 or the second sheet layer 2, or may be different from that of the first sheet layer 1 and the second sheet layer 2. For example, as shown in FIG. 2, the area of the solid layer is different from that of the first sheet layer 1 and the second sheet layer 2.

Further, in the embodiment of the present disclosure, in order to ensure the effect of the final product formed by the composite sheet, the thickness of the composite sheet is controlled within 0.3 mm to 5 mm and the density thereof is controlled within 0.5 kg/cm$^3$ to 5 kg/cm$^3$.

In addition, it should be noted that, in the embodiment of the present disclosure, the first sheet layer 1 is parallel to the second sheet layer 2, so that the first sheet layer 1 and the second sheet layer 2 may form the upper and lower surface of the housing respectively, and the thickness defined by the first sheet layer 1 and the second sheet layer 2 may be the thickness of the housing, for example 1.2 mm. However, in actual production, the first sheet layer 1 may be not parallel to the second sheet layer 2, for example, one surface of the solid layer 3 is an inclined surface, in this case the first sheet layer 1 is not parallel to the second sheet layer 2. Thus, the relative position between the first sheet layer 1 and the second sheet layer 2 is not limited in the embodiment of the present disclosure, in actual production, the relative position between the first sheet layer 1 and the second sheet layer 2 can be adjusted in time.

In the embodiment of the present disclosure, the composite sheet is formed of the first sheet layer 1, the second sheet layer 2 and the solid layer 3 located between the first sheet layer 1 and the second sheet layer 2, and the material of the solid layer 3 may be thermoplastic resin, the first surface of the solid layer 3 connects with the first sheet layer 1 and the second surface thereof contacts with the second sheet layer 2. Thus, this composite sheet is formed such that the first sheet layer 1 and the second sheet layer 2 can be joined to the composite sheet more tightly, moreover, the solid layer 3 of resin material can also reduce the weight of the entire composite sheet.

In addition, the solid layer 3 of resin material has a better deformation relative to foam material, thereby the solid layer 3 may be protruded from the interlayer space between the first sheet layer 1 and the second sheet layer 2, so that the solid layer 3 can be joined with other resin material while preventing other resin material from filling into the interlayer space between the first sheet layer 1 and the second sheet layer 2, thus, the deformation of the composite sheet caused by permeation is avoided and the rate of finished products of the composite sheet is increased.

In addition, because the solid layer 3 may be thermoplastic resin material which has a light weight, the entire weight of the composite sheet may be reduced. And during the over-molding process, the solid layer 3 can effectively prevent the injection molding plastics from permeating into the composite sheet and thus prevent the deformation problem of the sheet layers on the surfaces of the composite sheet caused by the permeation, so that the composite sheet can maintain a better shape and the product quality is increased.

In addition, because the solid layer 3 may be thermoplastic resin material, in the case that the rigidity of the housing is met, the number of layers of the reinforced material required by the first sheet layer 1 and/or the second sheet layer 2 is reduced, thus, the weight of the housing formed by the composite sheet is reduced and the cost thereof is also reduced.

The Second Embodiment

Figure 3:
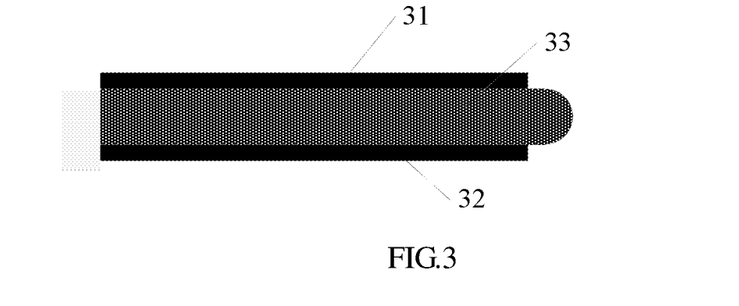
FIG. 3 is a schematic view showing a structure of a solid layer in the composite sheet according to an embodiment of the present disclosure.

The embodiment of the present disclosure provides a composite sheet, FIG. 3 is a schematic view showing the structure of the composite sheet according to another embodiment of the present disclosure, the composite sheet comprises: a first sheet layer 31 comprising at least one layer of first reinforced material, a second sheet layer 32 comprising at least one layer of second reinforced material, a solid layer 33 comprising first portion and second portion, wherein the first portion is the portion being protruded from the interlayer space between the first sheet layer 31 and the second sheet layer 32 under pressure, and the second portion is located in the interlayer space between the first sheet layer 31 and the second sheet layer 32 to bond the first sheet layer 31 with the second sheet layer 32.

Specifically, the first reinforced material comprises at least one of carbon fiber, glass fiber or Kevlar fiber. The first sheet layer 31 is formed by stacking at least the first fiber layer and the second fiber layer, wherein, there is a first stacking angle between the first fiber layer and the second fiber layer, the first stacking angle is an angle between the fiber of the first fiber layer and the fiber of the second fiber layer.

Alternatively, the second reinforced material comprises at least one of carbon fiber, glass fiber or Kevlar fiber. The second sheet layer 32 is formed by stacking at least the third fiber layer and the fourth fiber layer, wherein, there is a second stacking angle between the third fiber layer and the fourth fiber layer, the second stacking angle is an angle between the fiber of the third fiber layer and the fiber of the fourth fiber layer.

Wherein, the specifical composition between the first sheet layer 31 and the second sheet layer 32 has been described in detail in the first embodiment, it is no longer further explained here.

Further, in the embodiment of the disclosure, the solid layer 33 comprises the first portion and the second portion, FIG. 3 is a schematic view showing the structure of the solid layer according to the embodiment of the present disclosure, in FIG. 3, the first portion is the portion being protruded from the interlayer space between the first sheet layer 31 and the second sheet layer 32 under pressure, the first portion is used to connect thermoplastically with other portions.

The second portion is located in the interlayer space between the first sheet layer 31 and the second sheet layer 32 to bond the first sheet layer 31 with the second sheet layer 32.

Specifically, the composite sheet bonds with other plastic material through thermoplastic resin of the solid layer 33, so it needs to be disposed in a mold to be processed by over-molding, wherein a first pressure and a first temperature are applied through the mold, the first pressure and the first temperature are used as a first predefined condition, the solid layer 33 is softened when reaching the first temperature, and the softened thermoplastic resin material is protruded from the interlayer space under the first pressure, thereby the protruded portion forms the first portion of the solid layer 33. Wherein, the first temperature is a temperature at which the thermoplastic resin can be softened, for example the first temperature may be 80°-200°, the actually applied temperature may be determined according to the required softening degree. The first pressure may be set according to the required thickness of the composite sheet, for example, if the thickness of the composite sheet is 1 mm and the thickness thereof needs to be compressed to 0.8 mm, then the first pressure can be determined accordingly.

Obviously, the portion remained between the first sheet layer 31 and the second sheet layer 32 is used as the second portion.

Figure 4:
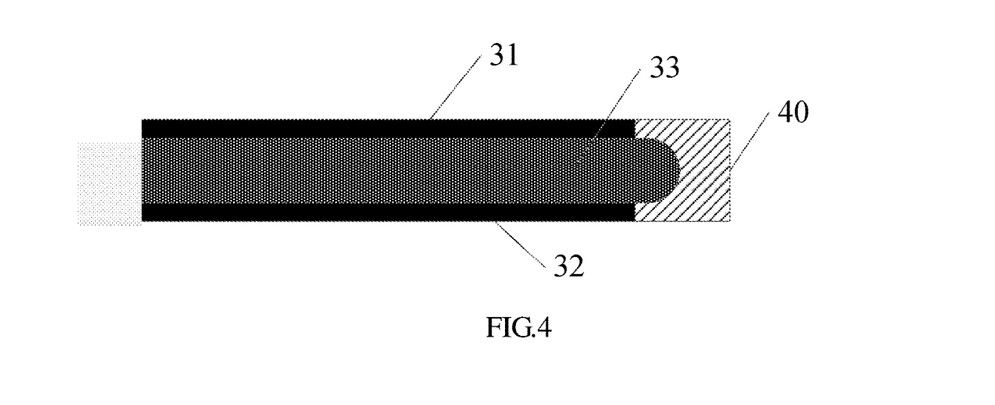
FIG. 4 is a schematic view showing connection between the solid layer and an injection molding part in the embodiment of the present disclosure.

Alternatively, in the embodiment of the present disclosure, as shown in FIG. 4, the composite sheet further comprises an injection molding part 40 which connects with the first portion of the solid layer 33, the injection molding part 40 is used to achieve a thermoplastic connection with other part of the electronic apparatus or to provide a position for mounting a fixing screw. It should be noted that the injection molding part 40 may be made of at least one of resin, plastics and mixed material of fiber and resin or plastics.

Figure 5:
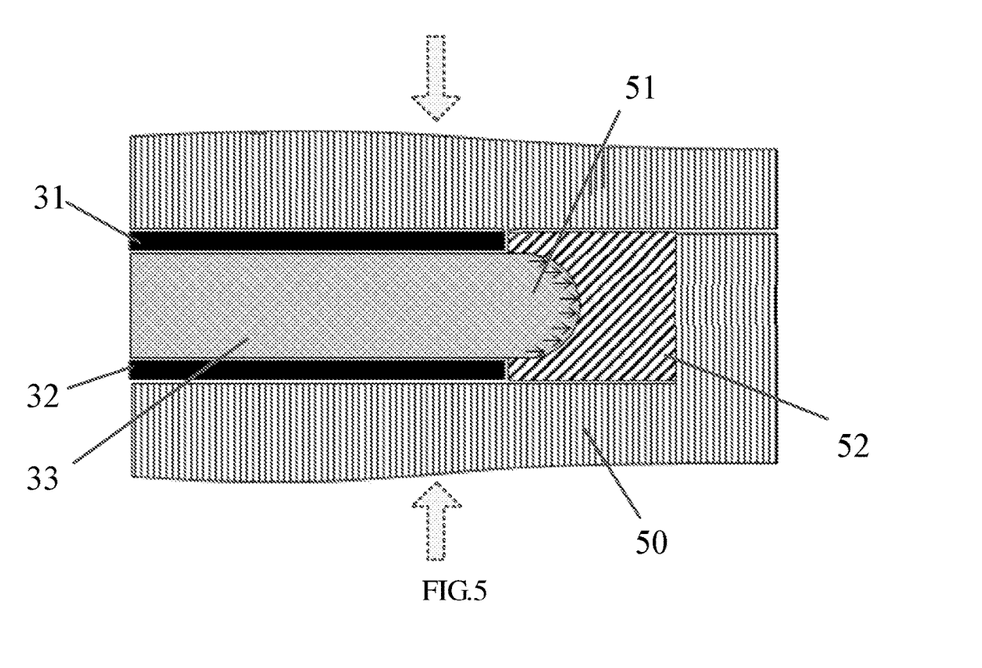
FIG. 5 is a schematic view in which the composite sheet according to the embodiment of the present disclosure is compressed in a preset mold.

Specifically, in an embodiment of the present disclosure, as shown in FIG. 5, the number 50 indicates a mold, the number 52 indicates the injection molding part and the number 51 indicates the first portion of the solid layer 3, the dotted arrow in FIG. 5 indicates the mold clamping force applied to the composite sheet. In this case, when the temperature in the mold is increased to the first temperature, the solid layer 33 located between the first sheet layer 31 and the second sheet layer 32 is to be softened, then the softened thermoplastic resin is protruded from the interlayer space, thereby the first portion of the solid layer 33 in FIG. 5 is formed.

After the first portion is suppressed out, the molten plastic material is filled into the cavity of the mold, thus the injection molding part 40 is formed in the cavity of the mold. In FIG. 5, the thickness of the injection molding part 40 is totally the same as the thickness of the composite sheet, but in the actual production, the thickness of the injection molding part 40 may be different from the thickness of the composite sheet, in other words, depending on different products, the thickness of the injection molding part 40 may be more than or less than the thickness of the composite sheet. The shape of the injection molding part 40 may also be adjusted as required. In the embodiment of the present disclosure, the injection molding part 40 is not limited to the structure as shown in FIG. 5. The formed injection molding part 40 can be used to achieve a thermoplastic connection with other parts of the electronic apparatus, or to provide a position for a fixing device such as a screw for fixing.

In actual application process, in order to increase further the strength of the product using the composite sheet, a protective layer may also be sprayed on the first external surface of the first sheet layer 31 and/or on the second external surface of the second sheet layer 32 to increase the properties of the housing, such as water proof, insulation and wear resistance. Wherein, the first external surface is a surface of the first sheet layer 31, which is parallel to, but does not contact with, the first surface of the solid layer 33; the second external surface is a surface of the second sheet layer 32, which is parallel to, but does not contact with, the second surface of the solid layer 33.

In the embodiment of the present disclosure, because the solid layer 33 of the composite layer is the thermoplastic resin, during the over-molding process, the soften solid layer 33 may form the first portion protruding from the interlayer space between the first sheet layer and the second sheet layer, so that it is bonded with the injection molding part 40 formed by the plastics injected into the cavity of the mold, thus there is a good shaping effect in the process of manufacturing the product using the composite sheet and the quality of the product is improved.

Here it should be noted that, in the embodiment of the present disclosure, the thickness of the composite sheets is controlled within 0.3 mm to 5 mm and the density thereof is controlled within 0.5 kg/cm$^3$ to 5 kg/cm$^3$. Thus, it is ensured that the produced composite sheet can be used in different apparatus.

In the embodiment of the present disclosure, a composite sheet is provided, the composite sheet comprises the first sheet layer 31, the second sheet layer 32 and the solid layer 33, the physical layer 33 comprises the first portion and the second portion, wherein the first portion is a portion of the solid layer, which protrudes from the interlayer space between the first sheet layer 31 and the second sheet layer 32 under the pressure, the second portion is located in the interlayer space between the first sheet layer 31 and the second sheet layer 32. In other words, in the embodiment of the present disclosure, the first portion of the solid layer 33 protrudes from the interlayer space, thus the first portion can bond with the injection molding part 40 more tightly.

In addition, due to the protruded first portion of the solid layer 3, the injection molding part 40 will not permeate into the interlayer space between the first sheet layer 31 and the second sheet layer 32 when the injection molding part 40 is filled into the mold 50, the deformation of the composite sheet, caused by permeating of the injection molding part 40 into the interlayer space, is thus avoided, therefore, the rate of finished products of the composite sheet is increased and the quality of the product is improved.

The Third Embodiment

Figure 6:
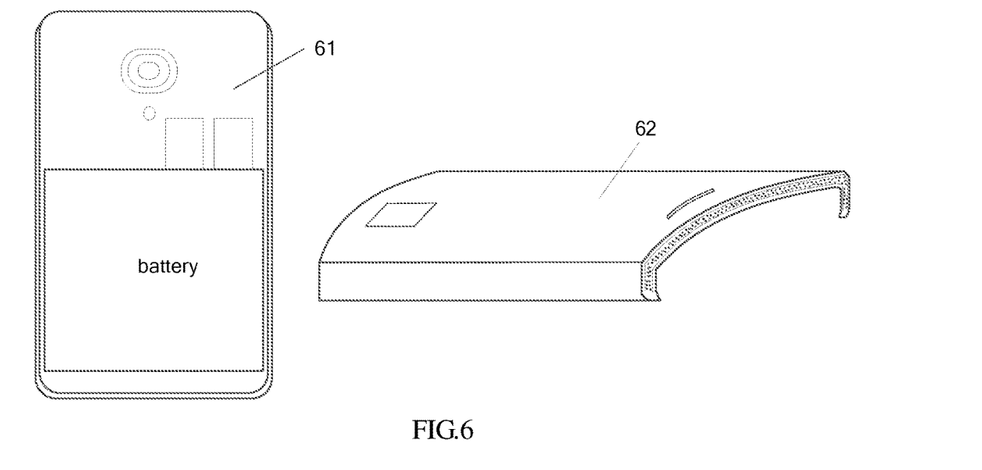
FIG. 6 is a schematic view showing a structure of an electronic apparatus according to an embodiment of the present disclosure.

Based on the same invention concept, the embodiment of the present disclosure further provides an electronic apparatus, FIG. 6 is a schematic view showing the structure of the electronic apparatus according to the embodiment of the present disclosure, in which the electronic apparatus comprises a body 61 and a housing 62.

The body 61 may comprise the main components of the electronic apparatus, for example, the body 61 may comprise a processor, a heat radiation part, a signal emitter, a display unit and the like. And the housing 62 may be a housing covering the outer surface of the body 61, such as the housing of the cell phone, the notebook computer and the like. In general, the housing 62 has a shape matching with the shape of the body 61 to achieve a better embedded fit with the body, thus the components within the body 61 are protected and the electronic apparatus is better protected.

Specifically, the housing 62 is formed of the composite sheet, and the composite sheet (as shown in FIG. 3) comprises the first sheet layer 31, the second sheet layer 32 and the solid layer 33 located between the first sheet layer 31 and the second sheet layer 32.

The solid layer 33 comprises the first portion and the second portion, wherein the first portion is the portion being protruded from the interlayer space between the first sheet layer 31 and the second sheet layer 32 under pressure, and the second portion is located in the interlayer space between the first sheet layer 31 and the second sheet layer 32 to bond the first sheet layer 31 with the second sheet layer 32.

The composite sheet may be formed by the first sheet layer 31, the second sheet layer 32 and the solid layer 33 in a manner of heat pressing or bonding process, such composite sheet may be a sandwich sheet of composite material. Wherein, the material of the solid layer 33 may be thermoplastic resin.

In actual production process, the specifically number of layers of reinforced material which is used by the first sheet layer 31 and/or the second sheet layer 32 may be determined according to the expected hardness and weight of the housing 62, so that the housings 62 having different hardness and weight can be obtained, thus, the housing 62 can be used to match with different types of the electronic apparatus.

Specifically, the first reinforced material of the first sheet layer 31 and the second reinforced material of the second sheet layer 32 may comprise at least one of carbon fiber, glass fiber, Kevlar fiber or fiber reinforced plastics. Typically, the thickness of each layer of the reinforced material is less than 0.2 mm, so that the thickness of the housing 62 may be within the range of 0.5 mm-1.5 mm. Alternatively, in the case that a higher hardness and a better light and thin property are ensured, the housing may be 1.2 mm in thickness, in this case, the first sheet layer and the second sheet layer may use two layers of reinforced fiber and the solid layer may fill in the interlayer portion located between the first sheet layer and the second sheet layer, which has a distance of 0.4 mm from the first sheet layer to the second sheet layer.

Further, the first sheet layer 31 is formed by stacking at least the first fiber layer and the second fiber layer, the second sheet layer 32 is formed by stacking at least the third fiber layer and the fourth fiber layer. Wherein, the first fiber layer and the second fiber layer are stacked at the first stacking angle, the first stacking angle is an angle between the fiber of the first fiber layer and the fiber of the second fiber layer. The third fiber layer and the fourth fiber layer are stacked at the second stacking angle, the second stacking angle is an angle between the fiber of the third fiber layer and the fiber of the fourth fiber layer. The first stacking angle and the second stacking angle will not affect each other, that is, the first stacking angle may be the same as or different from the second stacking angle.

In addition, the specifical composition of the first sheet layer 31 and the second sheet layer 32 has been described in detail in the first embodiment, it is no longer further explained here.

Further, in the embodiment of the disclosure, the solid layer 33 comprises the first portion and the second portion, specifically as shown in FIG. 3, the first portion is the portion being protruded from the interlayer space between the first sheet layer 31 and the second sheet layer 32 under pressure, the first portion is used to connect thermoplastically with the injection molding part 40 (as shown in FIG. 4).

The second portion is located in the interlayer space between the first sheet layer 31 and the second sheet layer 32 to bond the first sheet layer 31 with the second sheet layer 32.

Specifically, since the composite sheet bonds with other plastic material through thermoplastic resin in the solid layer 33, the composite sheet needs to be disposed in a mold to be processed by over-molding, wherein a first pressure and a first temperature are applied through the mold, the solid layer 33 is softened when reaching a certain temperature, and the softened thermoplastic resin material is protruded from the interlayer space under the first pressure, thereby the first portion of the solid layer 33 is formed.

Obviously, the portion remained between the first sheet layer 31 and the second sheet layer 32 is used as the second portion.

Alternatively, in the embodiment of the present disclosure, as shown in FIG. 4 of the first embodiment, the housing 62 further comprises an injection molding part 40 which connects with the first portion of the solid layer 33, the injection molding part 40 is used to achieve a thermoplastic connection with other parts of the electronic apparatus or to provide a position for mounting a fixing screw. Typically, the injection molding part may form a part on the housing 62, such as a corner, an edge seaming, a snap structure or the like.

In actual application process, in order to improve the strength and the appearance of the housing 62, the housing 62 of the electronic apparatus also comprises covering layers attached on at least one surface of the housing 62, wherein the covering layer is formed by material sprayed on the surfaces of the housing 62. Specifically, a protective layer is sprayed on the first external surface and/or the second external surface of the composite sheet used to form the housing 62, so as to increase the properties of the housing, such as water proof, insulation and wear resistance. Wherein, the first external surface is a surface of the first sheet layer 31, which is parallel to, but does not contact with, the first surface; the second external surface is a surface of the second sheet layer 32, which is parallel to, but does not contact with, the second surface.

In the embodiment of the present disclosure, because the solid layer 33 of the composite sheet is the thermoplastic resin, during the over-molding process, the soften solid layer 33 may form the first portion, so that it is bonded with the injection molding part 40 formed by the plastics injected into the cavity of the mold, thus there is a good shaping effect in the process of manufacturing the product using the composite sheet and the quality of the product is improved.

Figure 7:
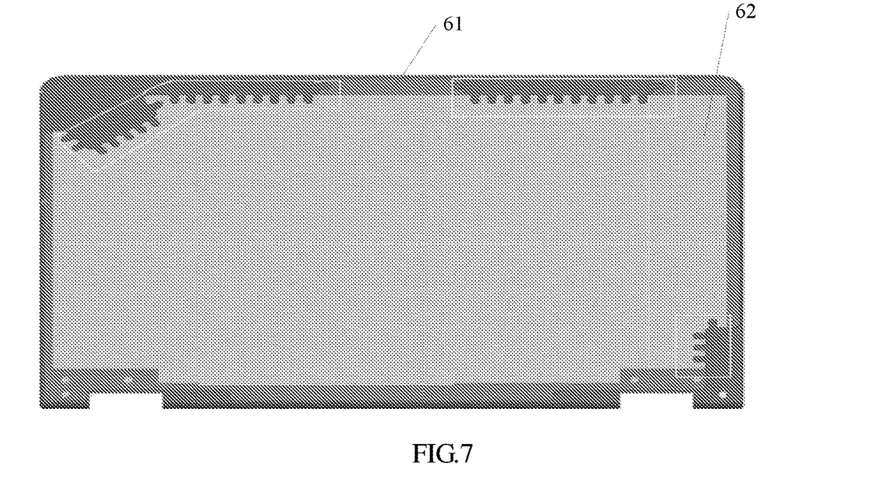
FIG. 7 is a schematic view showing a structure of a housing of the electronic apparatus according to an embodiment of the present disclosure.

Further, FIG. 7 is a structural schematic view showing that the housing 62 in the embodiment of the present disclosure is fixed on the body 61 of the apparatus, in FIG. 7, a portion with lighter colour is a portion of the housing 62 corresponding to the composite sheet, and a portion with darker colour is a portion of the body 61 of the electronic apparatus, a portion within the white line box is a region of the composite sheet in a flush joint with the body, other portion in which the composite sheet contacts with the body 61 is a region of lap joint.

It should be noted that, the region of flush joint is a region in which the injection molding part 40 of the composite sheet is in a directly thermoplastic connection with the plastic material of the body 61. Wherein, the portion having lighter colour and embedded in the portion with darker colour shows an effect of the top view of the portion formed after the first portion of the composite sheet joins with the injection molding part 40.

The region of lap joint is a portion of the composite sheet which is in a direct connection with the plastic material of the body 61. It should be noted that, the structure shown in FIG. 7 is just one type of structure in the actual production, and the region of flush joint and the region of lap joint of the composite sheet can be designed according to different requirements in the actual production.

An electronic apparatus is provided in the embodiment of the present disclosure, the housing 62 of the electronic apparatus comprises the first sheet layer 31, the second sheet layer 32 and the solid layer 33 located between the first sheet layer 31 and the second sheet layer 32, because the solid layer 3 is thermoplastic resin which can be softened under heat, in the case that the hardness of the housing 62 is met, the number of layers of the reinforced material required by the first sheet layer 31 and/or the second sheet layer 32 is reduced, and thermoplastic resin has a light weight, thus, the weight of the housing 62 formed by the composite sheet is reduced and the cost thereof is also reduced.

The Fourth Embodiment

Figure 8:
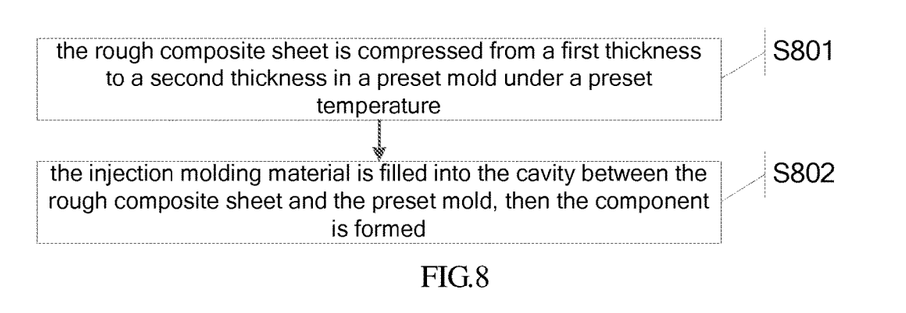
FIG. 8 is a flow chart showing a method for producing a component from the composite sheet according to an embodiment of the present disclosure.

A method for producing a component from the composite sheet is provided in the embodiment of the present disclosure, FIG. 8 is a flow chart showing the method according to the embodiment of the present disclosure, which comprises:

S801, the rough composite sheet is compressed from a first thickness to a second thickness in a preset mold under a preset temperature;

Firstly, before the rough composite sheet is compressed from a first thickness to a second thickness in a preset mold, the method further comprises: arranging at least one fiber layer, and arranging the solid layer on the upper surface of the arranged at least one fiber layer, and then arranging at least one fiber layer on the upper surface of the solid layer, such that a first composite sheet is formed, as shown in FIG. 1. The first composite sheet is compressed into the rough composite sheet according to a preset condition.

In the embodiment of the present disclosure, the first sheet layer is formed by stacking at least the first fiber layer and the second fiber layer, wherein there is a first stacking angle between the first fiber layer and the second fiber layer, the first stacking angle is an angle between the fiber of the first fiber layer and the fiber of the second fiber layer. Briefly, the fiber layers are stacked intersectingly. Similarly, the second sheet layer is formed by stacking at least the third fiber layer and the fourth fiber layer, wherein there is a second stacking angle between the third fiber layer and the fourth fiber layer, the second stacking angle is an angle between the fiber of the third fiber layer and the fiber of the fourth fiber layer.

Simply speaking, if multiple layers of fiber are arranged, for example, two layers of fiber are arranged at the first time, a thinner layer of resin may be coated on the upper surface of the first layer of fiber after it is arranged in place, and then the second layer of fiber is arranged, as such, a better bonding between each layer of fiber may be obtained through the resin located between each layer of fiber. The compression here is used to produce a better bonding between each fiber layer and the resin, thus, the strength of the first sheet layer and the second sheet layer is ensured.

The first sheet layer may all be formed of carbon fiber, or may be formed of mixed fiber of carbon fiber and glass fiber, or also may all be formed of glass fiber, and the specifical composition of the first sheet layer and the second sheet layer has been described in detail in the first embodiment, it is no longer further explained here.

In general, the first sheet layer and the second sheet layer can be compressed to about 0.2 mm in thickness, to ensure the strength of the first sheet layer while decreasing the weight of the first sheet layer at utmost, that is, both the quality and the weight of the first sheet layer and the second sheet layer are ensured, so that the first sheet layer and the second sheet layer can be formed more lightly and thinly.

After the first sheet layer and the second sheet layer are formed, the first sheet layer, the solid layer and the second sheet layer are stacked in sequence. It should be noted that the solid layer is sandwiched between the first sheet layer and the second sheet layer. The solid layer may be thermoplastic resin material. The thermoplastic resin has characteristics of softening on heat and hardening on cooling and has a stable chemical properties, in particular, it still maintains the stable properties no matter how many times it is heated and cooled. During the forming process, the resin is first softened to flow by pressurizing and heating without producing any chemical crosslinking, then it is shaped in a mold, and forms, after being cooled, a required product with the special shape. In general, the thermoplastic resin forming the solid layer may be polytene (PE), polyvinyl chloride (PVC), polyamide (PA), polycarbonate (PC), etc.

Alternatively, the thickness of the physical layer is about 1.1 mm, and this thickness can be changed in the specifical production progress.

After the first sheet layer, the solid layer and the second sheet layer are stacked, the first composite sheet layer is formed, the composite sheet can be cut into a suitable size according to the required design, and the final rough composite sheet is formed, then the final composite sheet is disposed in the preset mold.

The thickness of this final rough composite sheet is generally within a range of 0.3-5 mm and the density thereof is within a range of 0.5 kg/cm$^3$-5 kg/cm$^3$.

Further, the preset mold is a body having a slot with a certain depth, and the rough composite sheet is placed in the slot of the preset mold, the width of the slot of the preset mold is larger than the width of the composite sheet and the depth of the slot is smaller than the thickness of the composite sheet. In other words, after the rough composite sheet is placed in the slot of the preset mold, there will be a cavity in the slot and the rough composite sheet is higher than the slot of the preset mold.

In order that the solid layer between the first sheet layer and the second sheet layer can be heated to be softened, the temperature in the slot of the preset mold needs to be a certain preset temperature, so that the solid layer of the composite sheet formed of resin material is softened, but the solid layer formed of resin material will not be melted under the preset temperature. For example, if the solid layer is formed of resin material, the preset temperature is generally 80° C.

It should be noted that if the solid layer is not formed of resin material, the preset temperature is the temperature at which the material is softened.

Figure 9:
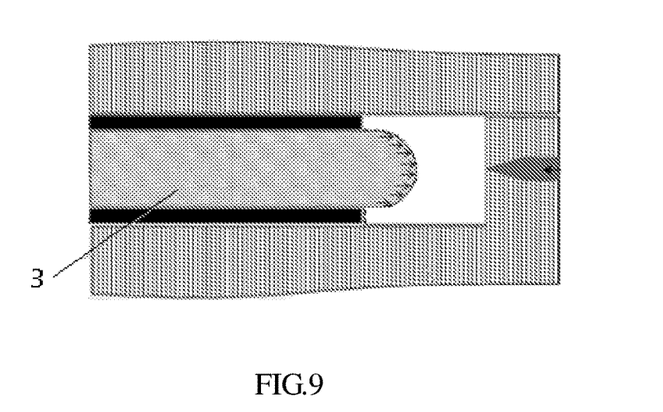
FIG. 9 is a schematic view in which the composite sheet according to an embodiment of the present disclosure is compressed in a preset mold to form a first portion.

After the solid layer is heated to the preset temperature, the preset pressure is applied to both the upper and lower surface of the preset mold. Because the solid layer between the first sheet layer and the second sheet layer has been softened, the solid layer will be protruded from between the first sheet layer and the second sheet layer after the preset pressure is applied, so that the structure as shown in FIG. 9 is formed. In FIG. 9, the softened resin material protrudes from between the first sheet layer and the second sheet layer.

Because the thickness of the rough composite sheet is larger than the depth of the slot of the preset mold, the rough composite sheet is compressed to a depth which is the same as the depth of the slot during the compression, in other words, the rough composite sheet is compressed from a first thickness to a second thickness. In the embodiment of the present disclosure, the difference between the first thickness and the second thickness is any value within 0.01 mm-3.0 mm.

For example, the thickness of the rough composite sheet is 1.5 mm and the depth of the slot of the preset mold is 1.3 mm, so the composite sheet will be 0.2 mm higher than the slot after it is placed in the slot of the preset mold. Because the width of the slot of the preset mold is larger than the width of the composite sheet, the resin material with 0.2 mm thickness will be protruded from between the first sheet layer and the second sheet layer after the preset pressure is applied to the rough composite sheet, so that the structure as shown in FIG. 9 is formed.

S802, the injection molding material is filled into the cavity between the rough composite sheet and the preset mold, the component is thus formed.

Figure 10:
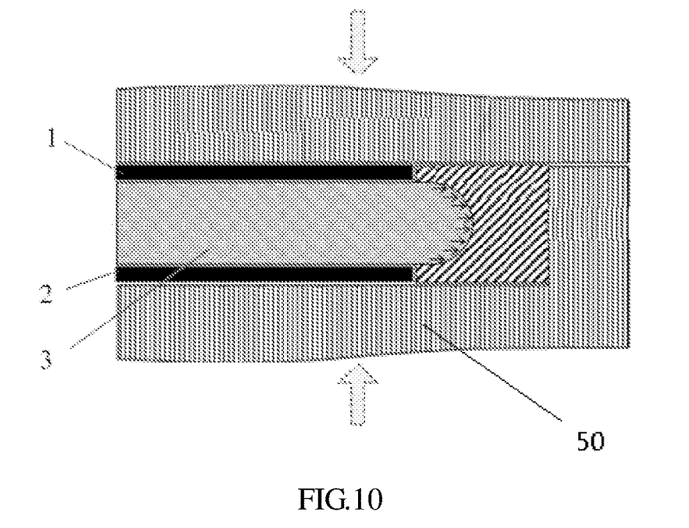
FIG. 10 is a schematic view in which the injection molding part is filled into a cavity according to an embodiment of the present disclosure.

In S801, the rough composite sheet has been compressed into the structure as shown in FIG. 9, in this case, the first portion of the composite sheet protrudes from the interlayer space formed between the first sheet layer and the second sheet layer. Because the width of the slot of the preset mold is larger than the width of the composite sheet, even if the protruded first portion is formed after the solid layer is compressed, there is still a certain cavity around the first portion, then the melted plastics or resin material is filled into the cavity of the slot of the preset mold through a channel disposed on the preset mold, thereby the first portion and the plastics or resin material filled into the cavity can be joined together thermoplastically, the structure as shown in FIG. 10 is thus formed. After the solid layer and the filled plastics and resin material are cooled, the formed final product is the component provided by the embodiment of the present disclosure.

Further, in the embodiment of the present disclosure, after the component is formed, a protective material may be sprayed on at least one external surface of the component.

Specifically, in order to make the component have a better hardness, wear resistance, water proof property and the like, one layer of protective material, for example, one layer of coloured paint, may be sprayed on the external surface of the compressed component, as a result, the wear resistance and water proof property, and also the appearance of the component, can be improved.

Alternatively, in the embodiment of the present disclosure, the formed component may also be fine machined to produce a component mounted on the electronic apparatus, for example the fine machining may be grinding, polishing the component, or other additional process, it is not explained in detail here.

In general, a method for forming a component of the composite sheet is provided in the embodiment of the present disclosure, the method comprises steps of: compressing a rough composite sheet from a first thickness to a second thickness in a preset mold at a preset temperature, then filling injection molding material into a cavity between the rough composite sheet and the preset mold, and the required component is formed. Because the solid layer is thermoplastic resin which has a light weight, the entire weight of the composite sheet may be reduced. And during the over-molding process, the solid layer can effectively prevent the injection molding plastics from permeating into the composite sheet and thus prevent the deformation problem of the sheet layers on the surfaces of the composite sheet caused by the permeation, so that the composite sheet can maintain a better shape and the product quality is increased.

Although several preferable embodiments have been shown and described, once those skilled in the art understand the basic concept of the present disclosure, various changes or modifications may be made in these embodiments. Thus, the appended claims intend to be understood to comprise the preferable embodiments and all these changes and modifications falling in the scope of the present disclosure.

It is obvious for those skilled in the art that various changes or modifications may be made in these embodiments without departing from the spirit and scope of the disclosure. If these changes and modifications fall in the scope defined in the claims and their equivalents, the present disclosure also intends to include these changes and modifications.

What is claimed is:

1. A composite sheet comprising:
   a first sheet layer comprising at least one layer of first reinforced material;
   a second sheet layer comprising at least one layer of second reinforced material;
   a solid layer located between the first sheet and the second sheet layer, wherein the solid layer comprises a first portion which is a portion of the solid layer being protruded from an interlayer space formed between the first sheet layer and the second sheet layer under pressure, and a second portion which is located in the interlayer space to bond the first sheet layer with the second sheet layer; and
   an injection molding part being in a thermoplastic connection with the first portion of the solid layer,
   wherein the solid layer is made of thermoplastic resin material, and wherein the solid layer has a same area as that of at least one of the first sheet layer and the second sheet layer before the first portion is protruded from the interlayer space.

2. The composite sheet according to claim 1, wherein the first reinforced material and the second reinforced material comprises at least one of carbon fiber, glass fiber and Kevlar fiber.

3. The composite sheet according to claim 2, wherein the first sheet layer is formed by stacking at least a first fiber layer and a second fiber layer, wherein there is a first stacking angle between the first fiber layer and the second fiber layer, and the first stacking angle is an angle between the fiber of the first fiber layer and the fiber of the second fiber layer.

4. The composite sheet according to claim 2, wherein the second sheet layer is formed by stacking at least a third fiber layer and a fourth fiber layer, wherein there is a second stacking angle between the third fiber layer and the fourth fiber layer, the second stacking angle is an angle between the fiber of the third fiber layer and the fiber of the fourth fiber layer.

5. The composite sheet according to claim 1, wherein the thickness of the composite sheet is within a range of 0.3 mm to 5 mm and the density of the composite sheet is within a range of $0.5 kg/cm^3$ to $5 kg/cm^3$.

6. The composite sheet according to claim 1, wherein the first sheet layer, the second sheet layer and the solid layer are joined by heat pressing or bonding process.

7. The composite sheet according to claim 1, wherein the injection molding part comprises at least one of resin, plastics and mixed material which is formed by mixing fiber with resin or plastics.

8. The composite sheet according to claim 1, wherein a first thickness of the injection molding part is the same as a second thickness of the composite sheet.

9. An electronic apparatus comprising:
 a body; and
 a housing having a shape mating with the body, the housing being formed of a composite sheet, wherein the composite sheet comprises a first sheet layer, a second sheet layer, a solid layer and an injection molding part, the first sheet layer comprises at least one layer of first reinforced material, the second sheet layer comprises at least one layer of second reinforced material, the solid layer is located between the first sheet and the second sheet layer;
 wherein the solid layer comprises a first portion and a second portion, the first portion is a portion of the solid layer being protruded from an interlayer space formed between the first sheet and the second sheet layer under pressure, and the second portion is located in the interlayer space to bond the first sheet layer with the second sheet layer, and
 wherein the injection molding part is in a thermoplastic connection with the first portion of the solid layer,
 wherein the solid layer is made of thermoplastic resin material, and wherein the solid layer has a same area as that of at least one of the first sheet layer and the second sheet layer before the first portion is protruded from the interlayer space.

10. The electronic apparatus according to claim 9, wherein the first sheet layer is formed by stacking at least a first fiber layer and a second fiber layer, wherein there is a first stacking angle between the first fiber layer and the second fiber layer, the first stacking angle is an angle between the fiber of the first fiber layer and the fiber of the second fiber layer.

11. The electronic apparatus according to claim 9, wherein the second sheet layer is formed by stacking at least a third fiber layer and a fourth fiber layer, wherein there is a second stacking angle between the third fiber layer and the fourth fiber layer, the second stacking angle is an angle between the fiber of the third fiber layer and the fiber of the fourth fiber layer.

12. The electronic apparatus according to claim 9, wherein the housing further comprises:
 a covering layer attached on at least one surface of the housing, wherein the covering layer is formed of material sprayed on the surface of the housing.

13. A method for producing a component from a composite sheet, comprising steps of:
 compressing a rough composite sheet from a first thickness to a second thickness in a preset mold under a preset temperature, so that a solid layer is heated to be softened to protrude from an interlayer space formed between a first sheet layer and a second sheet layer, wherein the first sheet layer comprises at least one layer of first reinforced material and the second sheet layer comprises at least one layer of second reinforced material; and
 filling an injection molding material into a cavity between the rough composite sheet and the preset mold to form the component, wherein the protruded portion of the solid layer is bonded with the injection molding material.

14. The method according to claim 13, wherein before the rough composite sheet is compressed from the first thickness to the second thickness in the preset mold, the method further comprises steps of:
 disposing at least one layer of fiber, the solid layer being disposed on an upper surface of the at least one layer of fiber, and then at least one layer of fiber being disposed on the solid layer to form a first composite sheet, wherein the layer of fiber on a lower surface of the solid layer is used as the first sheet layer and the layer of fiber on an upper surface of the solid layer is used as the second sheet layer; and
 compressing the first composite sheet into the rough composite sheet according to a preset condition.

15. The method according to claim 13, wherein the difference between the first thickness and the second thickness is any value within a range of 0.01 mm to 3.0 mm.

16. The method according to claim 13, further comprises a step of:
 spraying protective material on at least one external surface of the composite sheet.

* * * * *